(12) United States Patent
Flood

(10) Patent No.: US 7,744,941 B2
(45) Date of Patent: Jun. 29, 2010

(54) APPARATUS AND PROCESS FOR MARINATING FOODSTUFF

(76) Inventor: Adam Flood, 133 Wells Rd., Northport, NY (US) 11768

( * ) Notice: Subject to any disclaimer, the term of this patent is extended or adjusted under 35 U.S.C. 154(b) by 1382 days.

(21) Appl. No.: 11/099,782

(22) Filed: Apr. 4, 2005

(65) Prior Publication Data

US 2006/0222741 A1 Oct. 5, 2006

(51) Int. Cl.
*A23L 1/31* (2006.01)
(52) U.S. Cl. .......................... 426/281; 426/238; 99/451; 99/516; 99/532; 99/345
(58) Field of Classification Search ................. 426/281, 426/58, 238; 99/451, 516, 532–536, 494, 99/345–347; 366/273; 416/3
See application file for complete search history.

(56) References Cited

U.S. PATENT DOCUMENTS

| | | | | |
|---|---|---|---|---|
| 5,057,332 A | * | 10/1991 | Davidson et al. | ............ 426/281 |
| 5,325,996 A | * | 7/1994 | Bannigan | .................... 222/133 |
| 6,242,025 B1 | * | 6/2001 | Lesky et al. | ................. 426/281 |
| 6,309,685 B1 | * | 10/2001 | Kozari et al. | ................ 426/238 |
| 2003/0040672 A1 | * | 2/2003 | Ogura et al. | ................ 600/437 |

OTHER PUBLICATIONS

Hand annotated patent number 3908532; Underwood; p. 1-5, Sep. 30, 1975.*

* cited by examiner

*Primary Examiner*—Drew E Becker
*Assistant Examiner*—Steven Leff
(74) *Attorney, Agent, or Firm*—Leo G. Lenna

(57) ABSTRACT

The invention is directed to an apparatus and process for marinating foodstuffs in a short period of time. The apparatus includes a food holding container, a base and a shaft for transmitting ultrasonic mechanical vibrations from a source of ultrasonic vibrations in communication with a base, thereby tenderizing and imparting flavor to the foodstuffs. In addition to the ultrasonic vibrations, the apparatus can include a marinade injection system that injects marinade into the meat prior to being subjected to the ultrasonic vibrations.

15 Claims, 4 Drawing Sheets

APPARATUS AND PROCESS FOR MARINATING FOODSTUFF

BACKGROUND OF THE INVENTION

It is common practice to marinate less expensive cuts of meat prior to cooking, particularly when barbecuing, to tenderize and improve the flavor thereof. While marinating is generally successful in enhancing the flavor of the meat, its ability to tenderize is somewhat limited, and it is a very time consuming process. Marinating meat for as long as twenty-four hours prior to cooking is a common way to get the desired tenderness and flavor for many individuals. As time does not always permit such thorough marinating, the quality of the cooked steak is often less than what it would have been with proper preparation.

While marinating is generally not necessary with the higher quality and more expensive cuts of meat, lesser cuts, such as flank and shoulder steaks, will generally suffer in quality if not thoroughly marinated prior to cooking. Accordingly, people will often refrain from purchasing the less expensive cuts of meat because they either do not have the time to marinate the meat properly, and/or because they feel such meat is not sufficiently tender. While marinating is a simple process, the time it takes is often a substantial problem.

It would therefore be highly desirable to provide a means for thoroughly marinating foodstuffs that greatly reduces the time required to achieve the desired result. The apparatus and process disclosed herein not only thoroughly marinates foodstuffs in a small fraction of the time by using ultrasonic vibrations and/or injection methods heretofore required for the process, but also tenderizes the foodstuffs to a greater extent than conventional marinating in less time.

SUMMARY OF THE INVENTION

The present invention is directed to an apparatus and process for rapidly marinating foodstuffs to enhance the flavor and tenderness thereof. The apparatus includes a food holding container having a bottom wall with an outer and inner surface, side walls extending upwardly from each side of the bottom wall in adjoining relation and a plurality of bottom corners, the outer surface of the bottom wall having extensions protruding downward away from the outer surface of the bottom wall. The apparatus also contains a base comprising a plurality of cavities complementary to the extensions protruding downward away from the bottom wall. The extensions fit within the cavities so as to secure the food holding container to base.

Once the base containing the shaft for transmitting ultrasonic mechanical vibrations from a source of ultrasonic vibrations is activated vibrations are directly transmitted to the food holding container and any foodstuff in the container. When marinade is placed in the food holding container, the ultrasonic vibrations will enhance the absorption of marinade into the foodstuff. The ultrasonic vibration generator is attached to a variable speed knob that controls the frequency of the ultrasonic generator according to the type of meat being marinated.

The food holding container can be configured with a lid that covers the foodstuff while it is being marinated. The inner surface of the bottom wall may have a plurality of raised surfaces to assist in the marinating process once the ultrasonic vibration generator is activated.

In another embodiment of the present invention, the vibrating marinator above is combined with an injection marinator for marinating foodstuff. This apparatus comprises a food holding container having a bottom wall with an outer and inner surface, sidewalls extending upwardly from each side of said bottom wall in adjoining relation and a plurality of bottom corners. The sidewalls are configured so as to contain a deep cavity having an inner edge and an outer edge that is continuous around the circumference of the food holding container. This cavity is designed so as to fit the cover directly into it so that when pressure is supplied to the cover the inner surface of the cover pushes down against the plunger device thereby forcing liquid from at least one injection device for injecting fluid into an item.

The injection wells can be filled with marinade by removing a threaded cap from the top of the well. Once the well is filled with marinade, the threaded cap is screwed back on to the well and when the plunger is advanced marinade is forced forward out of the injection heads at the opposite end of the injection well. A plurality of these wells and heads is recommended for enhanced performance.

In one embodiment the injection wells are positioned within a well injection plate configured to hold the injection wells above the foodstuff to be marinated. The injection heads can be removable so that they can be removed when they need to be cleaned or changed because they become ineffective.

In another embodiment of the invention the marinator for marinating food further comprise a means for agitating the marinade. The means for agitating the marinade contains a magnet that spins so as to rotate a magnetic stirring rod located within said well. In other words, the means for agitating the marinade is positioned on the outside of the food container directly below the well and the magnetic stirring rod is positioned within the well. Once the magnet in the means for agitating the marinade is activated the magnetic stirring rod begins to spin and agitated the marinade. The agitating means can be combined with an agitation means, an injection means as well as the sonic means all described. The well of the food container allows the agitating means to operate without coming into direct contact with the meat to be marinated. The food container can be designed to have more than one well/agitating assembly.

The present invention is also directed to a method for marinating food using the apparatus of the present invention. The method for marinating food comprises placing food to be marinated in a food holding. The food holding container has a bottom wall with an outer and inner surface, side walls extending upwardly from each side of the bottom wall in adjoining relation and a plurality of bottom corners. The outer surface of the bottom wall has extensions protruding downward away from the bottom wall. Once in place the marinade is added to the food holding container and the food container is placed in a base comprising a plurality of cavities complementary to the extensions protruding downward away from the bottom wall of the food holding container.

Once in place a shaft for transmitting ultrasonic mechanical vibrations from a source of ultrasonic vibrations in communication with the base is activated. The same method can be used in conjunction with each embodiment of the invention.

The above injection features are combined with the base comprising a plurality of cavities that are complementary to the extensions protruding downward away from the bottom wall of the food holding container. Once the food holding container is positioned in place and the shaft for transmitting ultrasonic mechanical vibrations to the base is actuated the food added to the food holding container is subjected to the vibrations allowing the marinade to penetrate quickly.

It is the principal object of the present invention to provide a method and apparatus for thoroughly marinating foodstuff in a short period of time. It is another object of the present invention to provide a method and apparatus for rapidly imparting the flavor of a marinade to an inexpensive cut of meat, while concurrently tenderizing the meat. These and other objects and advantages of the present invention will become apparent from the following detailed description taken in connection with the accompanying drawings.

BRIEF DESCRIPTION OF THE FIGURES

Figure 1:
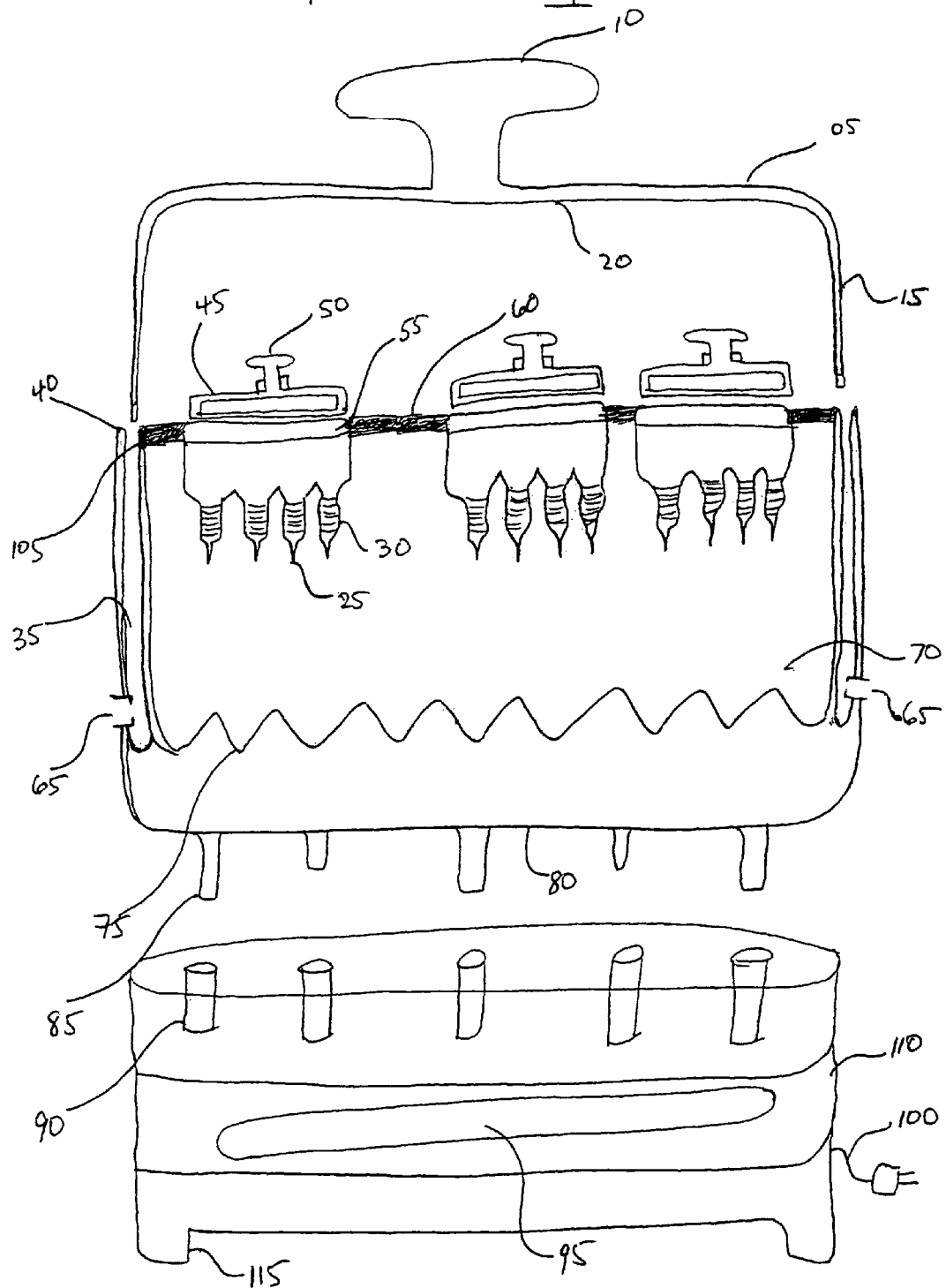
FIG. 1 is an expanded cross section view of the vibrating/injector marinator of the present invention.

FIG. 1:
(01) Injection/vibrating marinator
(05) cover
(10) handle of cover
(15) extended sidewalls of cover
(20) underside of cover
(25) injection needles
(30) injection heads
(35) well
(40) extended sidewall tracks
(45) screw-on cap of the injection well
(50) plunger
(55) injection well
(60) injection well plate
(65) pressure relief port
(70) food container
(75) tenderizing ripples
(80) bottom of food container
(85) bottom extension
(90) extension well
(95) vibration/sonic generator
(100) power
(105) ledge for injection well plate
(110) stand
(115) legs for stand FIG. 2:
(200) Injection/vibrating marinator
(205) cover
(210) handle of cover
(215) extended side walls of cover
(220) underside of cover
(225) injection needles
(230) injection heads
(235) extended side wall tracks
(240) screw-on cap of the injection well
(245) plunger
(250) injection well
(255) injection well plate
(260) pressure relief port
(265) food container
(270) tenderizing ripples
(275) bottom of food container
(280) bottom extension
(285) extension well
(290) vibration/sonic generator
(295) power
(300) stand
(305) meat
(310) legs for stand FIG. 3:
(400) Injection well plate
(405) solid body
(410) cut-out for injection well FIG. 4:
(500) vibrating sonic marinator
(505) cover
(510) food container
(515) tenderizing ridges
(520) power
(525) vibrator/sonic generator
(530) extensions
(535) wells for extensions
(540) stand
(545) legs for stand

DETAILED DESCRIPTION OF THE INVENTION

Most people enjoy a marinated piece of meat on the barbeque or in the oven. Marinating meat, if done properly, can make a cheaper cut of meat cut like butter and taste like fillet mignon. However, to properly marinade a piece of meat it is imperative that the marinade be able to penetrate the meat and breakdown the marblization of the meat in order to make it tender and provide flavor. Using conventional marinating techniques this usually takes hours and often-over night. The present invention described using FIGS. 1-4 properly marinades meat in much less time than conventional marinating techniques, i.e. place meat in marinade and let sit in refrigerator over night, available today.

FIG. 1 describes one embodiment of the invention comprising injection and vibrating mechanisms to enhance the process of marinating. The invention shown in FIG. 1 comprises three main parts namely, a cover (05) that force can be applied to, a food container (70), and a vibrator/sonic generator (95).

The cover (05) comprises a handle (10) that is constructed of reinforced heavy-duty material that can withstand an applied downward force, and an underside portion (20). The underside portion (20) is designed so that when a downward force is applied to the handle (10) the underside portion (20) pushes against the plungers (55) of injection wells (55) and forces marinade into the meat. The cover (05) also comprises extended side walls (15) that are designed to fit into extended sidewall tracks (40) of the food container (70) of the present invention.

The food container (70) is made of several parts that can be disassembled so that it can be manually cleaned or placed in a dishwasher. The three main components of the food container (70) are the injection well plate (60), the injection wells (55), and the food container (70). The food container (70) is designed to hold not only the meat to be marinated but the liquid marinade as well. For this reason it is important that the food container be leak proof. The food container (70) can have tenderizing ripples (75) that aid in tenderizing meat placed in the container when vibration and/or force are applied to the meat. As mentioned above, the food container (70) has extended sidewall tracks (40) that are designed so that the extended sidewalls (15) of the cover (05-FIG. 1) fit into extended sidewall tracks (40).

The bottom (80) of the food container (70) is configured to have a multiplicity of bottom extension (85). The bottom extensions (85) are complementary to the extension wells (90) of the stand (170). Locking the bottom extensions (85) into the extension wells assures that the food container (70) is firmly attached to the stand shown in FIG. 3. The food container (70) has a ledge (105) that the injection well plate (60) of the invention rests upon.

The injection well plate (60) has several cutouts for the injection wells. The injection wells (55) can be removed from the injection well plate (60) and both the individual injection wells (55) and the injection well plate can be easily cleaned. The injection wells (55) each have a plunger (50) and a screw-on top (45). The screw-on top (45) can be removed by screwing the top off of the injection wells to reveal the cavity of the injection well (55).

The cavity of the injection well (55) can be filled with marinade. Each injection well (55) can be filled with the same marinade or a different marinade. Once filled, the screw-on top of the injection well (55) is secured in place and the injection well (55) is ready to be used. When force is applied to the handle of the cover and the underside of the cover presses against the plunger (50) of each of the injection wells (55) the plunger is pushed downward. As additional pressure is applied and the plunger is advanced downward marinade is forced through the injection heads (30) and out of the injection needles (25). The extended side tracks (40) of the food container (70) is fitted with a pressure release valve (65) that allows air to escape as the extended side walls of the cover travels down the well (35) of the food container (70).

Once the injection needles (25) come in contact with the meat in the food container (70) the marinade is infused into the meat while the needles tenderize the meat as well. The meat is then pressed against the tenderizing ripples (75) while aids in tenderizing the meat. The marinade that leaks out of the meat remains in the food container (70) and can re-enter the meat when the vibrator/sonic generator (95) is activated.

The stand (170) having several support legs (115) has a vibrator/sonic generator (95) built in it. The vibrator/sonic generator (95) once activated produces movement that causes the excess marinade in the food container (70) to vibrate into the meat further tenderizing the meat. The vibrator/sonic generator (95) in the stand can be powered by AC/DC via a power cord (100) or can be have a battery compartment so that the /sonic generator (95) can be powered by battery.

Overall FIG. 1 shows a unique tenderizing/marinade apparatus that tenderizes/marinades meat by direct injection of marinade, pressure against the tenderizing ripples of the food container (70) and the sonic/vibration application of the device. The three different marinating techniques described above speed up the marinating of the meat in the food container while tenderizing the meat at the same time.

Figure 2:
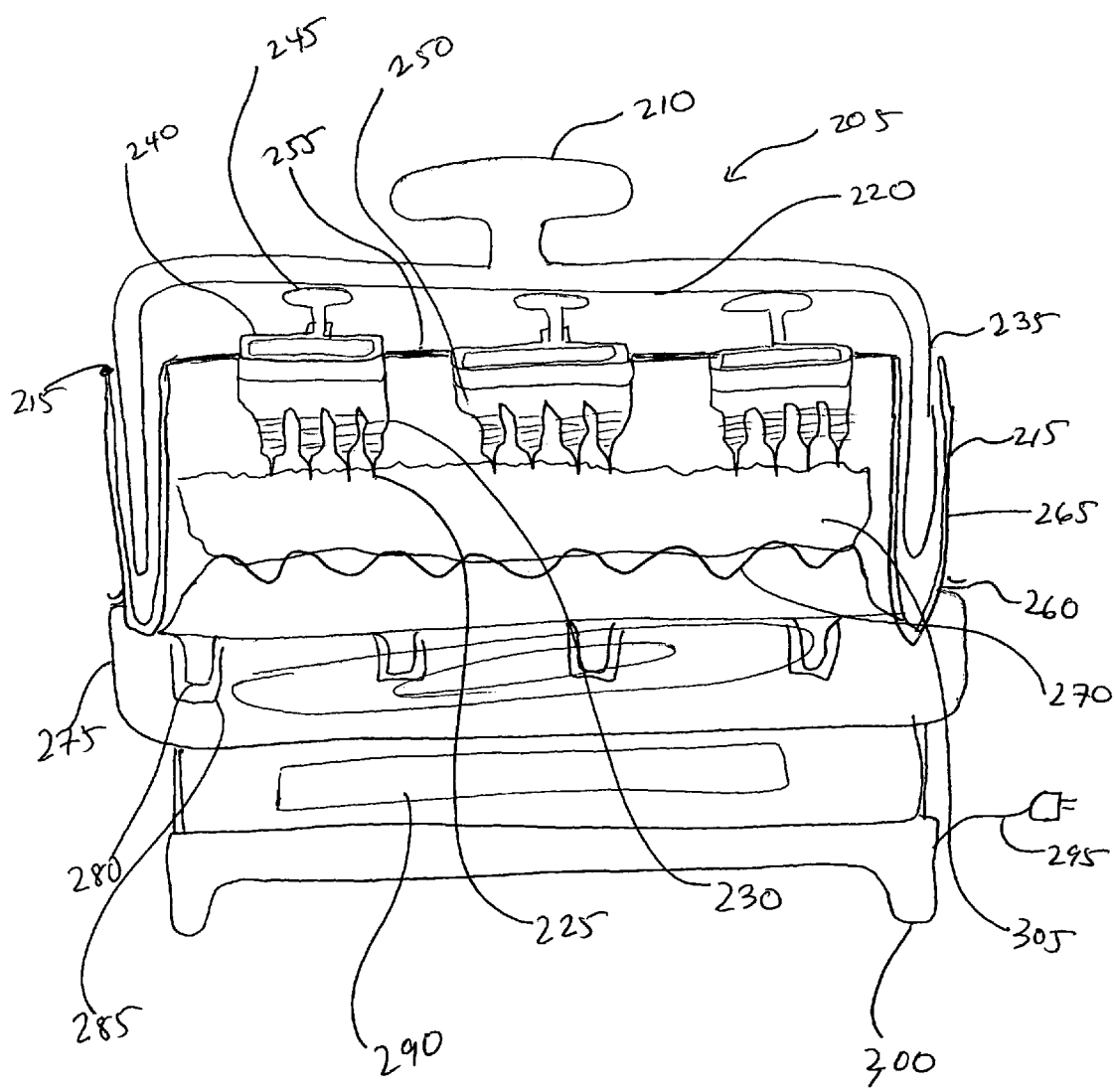
FIG. 2 is a cross section view of the assembled vibrating/injector marinator of the present invention.

FIG. 2 shows the injection/vibration apparatus in activated position. In other words, the apparatus with the cover advanced downward so as to release marinade from the injection heads. FIG. 2, as does FIG. 1, comprises three main parts namely, a cover (205) that force can be applied on to, a food container (265) for holding the meat to be marinated, and a vibrator/sonic generator (290).

The cover (205) comprises a handle (210) that is constructed of reinforced heavy-duty material that can withstand an applied downward force, and an underside portion (220). The underside portion (220) is designed so that when a downward force is applied to the handle (210) the underside portion (220) pushes against the plungers (245) of injection wells (250) and forces marinade into the meat. The cover (205) also comprises extended side walls (235) that are designed to fit into extended sidewall tracks (260) of the food container (265) of the present invention.

FIG. 2 shows the extended side walls (235) sliding into the extended sidewall tracks (260) and the underside portion (220) of the cover making contact with the plungers (245) of the injection wells (250). In this position the marinade in the injection wells is advance out of the injection needles (225) into the meat to be marinated. This begins one aspect of the marinating/tenderizing process.

As described in FIG. 1, the food container (265) is made of several parts that can be disassembled so that it can be manually cleaned or placed in a dishwasher. The three main components of the food container (265) are the injection well plate (255), the injection wells (250), and the food container (265). The food container (265) is designed to hold not only the meat to be marinated but the liquid marinade as well. For this reason it is important that the food container be leak proof. The food container (265) can have tenderizing ripples (270) that aid in tenderizing meat placed in the container when vibration and/or force are applied to the meat (305).

The bottom of the food container (265) is configured to have a multiplicity of bottom extension (280). The bottom extensions (280) are complementary to the extension wells (285) of the stand (300). Locking the bottom extensions (280) into the extension wells (285) assures that the food container (265) is firmly attached to the stand (300) as shown. The injection well plate (255) of the invention rest upon a portion of the food container (255) in such a way that the downward force applied by an outside source does cause the plate to move. The injection plate can then be lifted off of its resting position so that it can be cleaned.

The injection well plate (255) has several cut-outs for the injection wells. Once the injection well plate (255) is removed for cleaning, the injection wells (285) can also be removed from the injection well plate (255) so that they can be easily cleaned. The injection wells (285) each have a plunger (295) and a screw-on top (240). The screw-on top (240) can be removed by screwing the top off of the injection wells and the injection well (285) can be filled with marinade. Once filled, the screw-on top of the injection well (285) is secured in place and the injection well is ready to be used. As shown in this figure, once force is applied to the handle of the cover and the underside of the cover presses against the plunger (295) of each of the injection wells (285) the plunger is pushed downward and the plunger is shown in the advanced position. In this position the marinade is forced through the injection heads (230) and out of the injection needles (225) and into the meat (305).

As the injection needles (225) come in contact with the meat (305) in the food container (265) the marinade is infused into the meat (305) while the needles tenderize the meat as well. The meat is then pressed against the tenderizing ripples (270) while aids in tenderizing the meat. The marinade that leaks out of the meat remains in the food container (265) and can re-enter the meat when the vibrator/sonic generator (290) is activated.

The stand (300) having several support legs houses a vibrator/sonic generator (290) that once activated produces movement that causes the excess marinade to message the meat (300) in the food container (265) and enter the meat (300). As stated above in FIG. 1 the vibrator/sonic generator (290) in the stand (300) can be powered by AC/DC via a power cord (295) or can be battery driven or both.

The number of injection wells and type of injection needles can change with the type of marinating to be accomplished. For example, marinating steak could possibly use a different needle than what would be used for marinating fish or vegetables. The present invention anticipates the need for different types of needles for different uses and the use of interchangeable needles for different situations is clearly intended to fall within the scope of the present invention.

Figure 3:
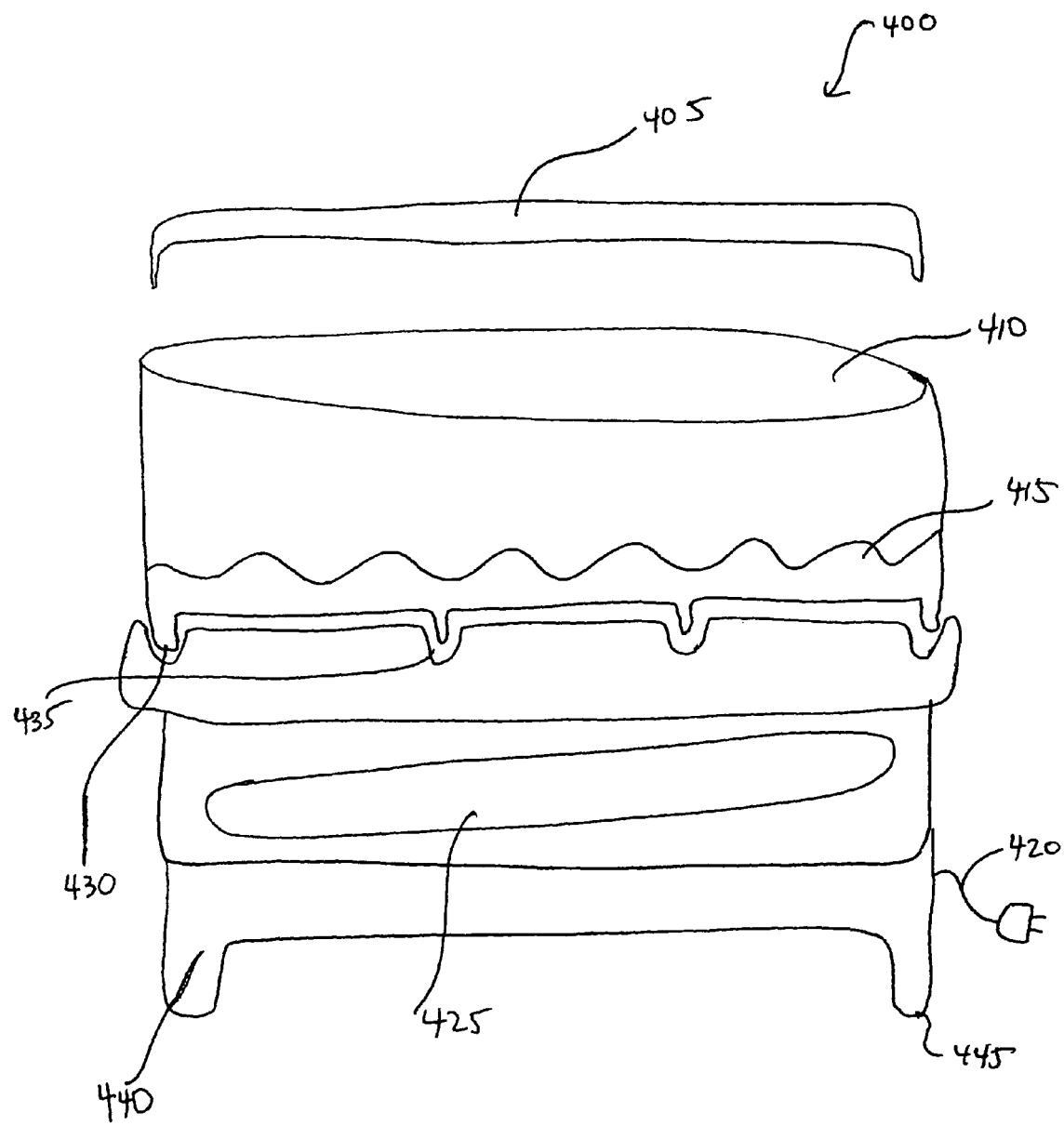
FIG. 3 is a side view of the vibrating marinator of the present invention.

FIG. 3 shows a top view of the injection well plate of the invention. The injection well plate (400) is shown with a multiplicity of cut outs (410) to fit complimentary injection wells. The solid body (405) that surrounds the holes is made of a material that is designed to withstand the force placed on it from the cover handle.

Figure 4:
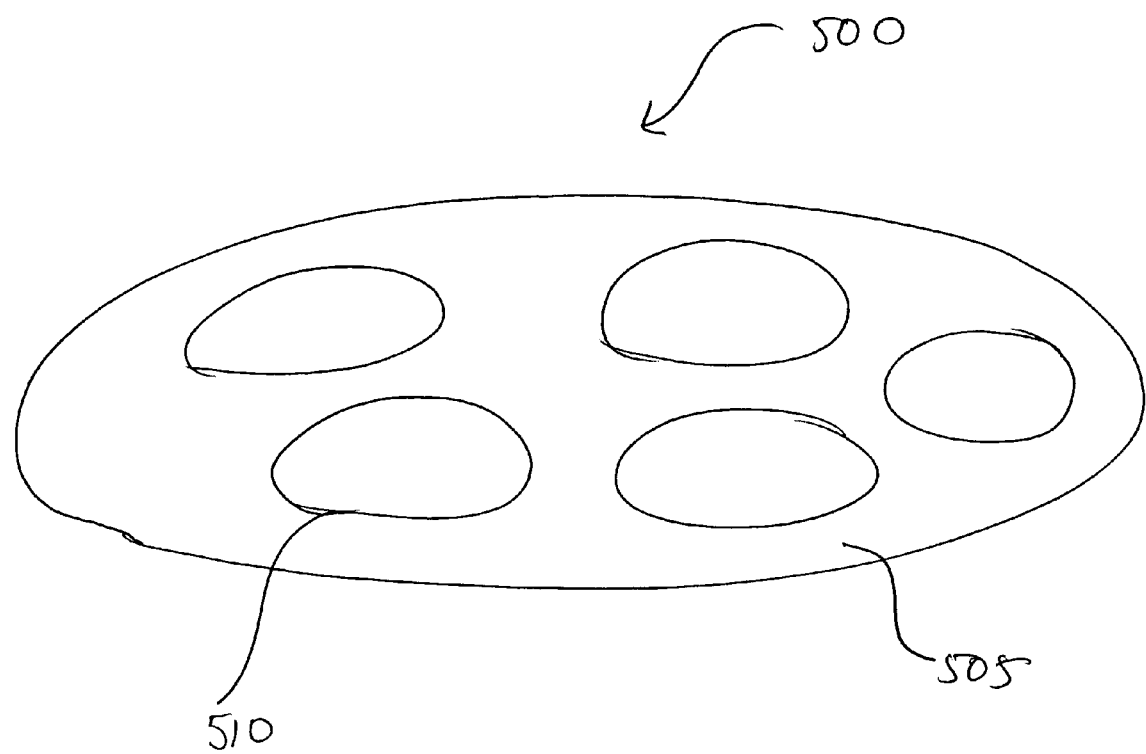
FIG. 4 is a top view of an injection well plate of the present invention.

FIG. 4 shows a front view of a different embodiment of the invention that utilizes vibrations/sonic movement of the marinade to message the meat and penetrate into the meat. As shown, the vibrating/sonic marinator (500) comprises three main components namely, the cover (505), the food container (510) and the vibrator/sonic generator (525) housed in a stand (540). In this embodiment there are no injection wells and therefore no several of the components necessary for FIGS. 1 and 2.

The cover (505) can be less sturdy than in FIGS. 1 and 2 and in fact can be made from a rubber-like plastic that can be used to tightly fit onto the food container (510) for storage. The cover (505) once properly fitted onto the rim of the food container prevents splashing of the marinade when the vibrator/sonic generator (525) is activated.

Like FIGS. 1 and 2 the food container (510) can be designed with tenderizing ridges (515) that aid in tenderizing the meat when the vibrating/sonic marinator (500) is activated. The food container (510) can also be made of a rubber-like plastic that makes a tight fit with the cover when attached. The food container (510) is configured to have extension (530) that protrude away from the bottom of the container and are designed to fit into extension wells (535) on the stand (540). This configuration as shown in FIGS. 1 and 2 allows the food container to be in intimate contact with the vibrator/sonic generator (525) as well as keeps the food container in place while it is vibrated. This design also allows for easy disassembly so that the cover and the food container can be used to store the meat for later use and/or for easy clean up. The food container and cover should be made out of microwavable/dishwasher safe material so that these tasks can be safely performed without harming the integrity of these components.

Once the food container (510) and cover (505) are set in place and the vibrating/sonic marinator (500) is activated, the movement of the container causes the marinade to message the meat and penetrate into the meat at a rapid rate. The faster and more powerful the vibrating/sonic generator the more messaging action that occurs and the faster and more thorough the meat is marinated. As mentioned above, the food container/cover can be removed from the stand and placed in the refrigerator till ready for the oven/BBQ. Once the meat is cooked the food container can be used to store the leftovers and when desired used to heat up the leftovers in the microwave. Then when complete the stand (540) can be whipped clean and the food container/cover placed in the dishwasher for sterilization for future use.

While the invention has been illustrated and described with respect to specific illustrative embodiments and modes of practice, it will be apparent to those skilled in the art that various modifications and improvements may be made without departing from the scope and spirit of the invention.

The invention claimed is:

1. A marinator for marinating food comprising:
   a food holding container having a bottom wall with an outer and inner surface, side walls extending upwardly from each side of the bottom wall in adjoining relation and a plurality of bottom corners, said outer surface of said bottom wall having extensions protruding downward away from said bottom wall;
   a base comprising a plurality of cavities complementary to said extensions protruding downward away from said bottom wall;
   a shaft for transmitting ultrasonic mechanical vibrations from a source of ultrasonic vibrations in communication with said base; at least one injection well comprising a plunger for forcing a marinade within said at least one injection well into a food, an injection well plate comprising a plurality of holes configured to hold said at least one injection well;
   and a means for agitating said marinade within said at least one injection well comprising a magnet positioned directly below said at least one injection well and a magnetic stirring rod positioned within said at least one injection well for agitating said marinade.

2. The marinator for marinating food according to claim 1 further comprising a lid for enclosing said food holding container having a rear edge and a front edge, the shape of said lid conforming to said opening such of said food container so that said lid generally seals said food container.

3. The marinator for marinating food according to claim 2 wherein said shaft for transmitting ultrasonic mechanical vibrations is variable speed and said shaft is in communication with a variable speed control knob.

4. The marinator for marinating food according to claim 3 wherein the inner surface of the bottom wall comprises a plurality of raised surfaces.

5. A vibrating injection marinator for marinating food comprising:
   a food holding container having a bottom wall with an outer and inner surface, side walls extending upwardly from each side of said bottom wall in adjoining relation and a plurality of bottom corners, said side walls defining a cavity having an inner edge and a front edge continuous around said circumference of said food holding container;
   a lid having a inner surface and an outer surface for enclosing said food holding container said lid having an extended side wall configured to fit within said cavity of said food holding container;
   at least one injection well comprising a plunger for forcing a marinade forward positioned within said at least one injection well for injecting the marinade into a food;
   an injection well plate comprising a plurality of holes configured to hold said injection wells;
   a base comprising a plurality of cavities complementary to extensions protruding downward away from said bottom wall;
   a shaft for transmitting ultrasonic mechanical vibrations from a source of ultrasonic vibrations in communication with said base;
   and a means for agitating said marinade within said at least one injection well comprising a magnet positioned directly below said at least one injection well and a magnetic stirring rod positioned within said at least one injection well for agitating said marinade.

6. The vibrating injection marinator for marinating food according to claim 5 wherein said plunger of said injection well fits within a cover and a portion of said plunger extends through said cover whereby pushing on said plunger advances the plunger in the downward direction.

7. The vibrating injection marinator for marinating food according to claim 6 wherein said cover and injection wells comprise threads wherein said threads on said cover are configured to interlock with said threads on said injection wells.

8. The vibrating injection marinator for marinating food according to claim 7 wherein said injection devices are configured so as to be removable.

9. The vibrating injection marinator for marinating food according to claim 7 wherein the injection well plate is configured to lock into the inner edge of said food-holding container.

10. The vibrating injection marinator for marinating food according to claim 9 wherein said injection well plate is constructed from a rigid material.

11. The vibrating injection marinator for marinating food according to claim 9 wherein said injection well plate is constructed from a material selected from composite plastic, plastic, stainless steel, aluminum, coated metal, and dishwasher safe material.

12. The vibrating injection marinator for marinating food according to claim 7 wherein the outer edge of said food holding container has at least one air relief port.

13. The vibrating injection marinator for marinating food according to claim 5 wherein the lid further comprises a push down handle.

14. A method for marinating food comprising:
   placing food to be marinated in a marinator for marinating food of claim 1; adding marinade to said marinator; and
   activating said shaft for transmitting ultrasonic mechanical vibrations to produce marinated food.

15. A method for marinating food comprising:
   placing food to be marinated in a marinator for marinating food of claim 5;
   adding marinade to said marinator;
   forcing liquid into said food to be marinated with at least one injection device for injecting fluid into said food; and
   activating said shaft for transmitting ultrasonic mechanical vibrations to produce marinated food.

\* \* \* \* \*